United States Patent
Heiniger et al.

(10) Patent No.: US 11,868,024 B2
(45) Date of Patent: Jan. 9, 2024

(54) FREQUENCY-CONVERSION OF AN OPTICAL FREQUENCY COMB

(71) Applicant: TOPTICA Photonics, Inc., Farmington, NY (US)

(72) Inventors: Adam Taylor Heiniger, Rochester, NY (US); Matthew James Cich, Fairport, NY (US)

(73) Assignee: TOPTICA Photonics, Inc., Farmington, NY (US)

( * ) Notice: Subject to any disclaimer, the term of this patent is extended or adjusted under 35 U.S.C. 154(b) by 266 days.

(21) Appl. No.: 17/145,835

(22) Filed: Jan. 11, 2021

(65) Prior Publication Data
US 2022/0224070 A1   Jul. 14, 2022

(51) Int. Cl.
G02F 1/39      (2006.01)
G02F 1/35      (2006.01)
H01S 3/00     (2006.01)

(52) U.S. Cl.
CPC ........... *G02F 1/39* (2013.01); *G02F 1/3503* (2021.01); *G02F 1/3546* (2021.01); *H01S 3/0092* (2013.01)

(58) Field of Classification Search
CPC ........ G02F 1/3503; G02F 1/3546; G02F 1/39; H01S 3/0092
See application file for complete search history.

(56) References Cited

U.S. PATENT DOCUMENTS

| | | | | |
|---|---|---|---|---|
| 5,999,547 | A * | 12/1999 | Schneider | G02F 1/39 372/21 |
| 9,057,927 | B2 * | 6/2015 | Hu | G02F 1/3551 |
| 2019/0089121 | A1 * | 3/2019 | Mueller | G02F 1/39 |
| 2020/0285131 | A1 * | 9/2020 | Marandi | G02F 1/39 |

FOREIGN PATENT DOCUMENTS

EP    3096183 A1 * 11/2016 ............ G02F 1/37

OTHER PUBLICATIONS

Yabai He et al., "Tunable Single-Mode Operation of a Pulsed Optical Parametric Oscillator Pumped by a Multimode Laser", Applied Optics, vol. 40, No. 27, Sep. 20, 2001, pp. 4836-4848. (Year: 2001).*

Adler, Florian et al.; "Phase stabilized, 1.5-W frequency comb at 2.8 to 4.8 μm"; Optics Letters; vol. 34; 2009; pp. 1330-1332.

(Continued)

*Primary Examiner* — Daniel Petkovsek
(74) *Attorney, Agent, or Firm* — Adams and Reese LLP; Ray R. Ferrera

(57) ABSTRACT

A method of practicing the invention includes at least the following steps of generating pump laser radiation having a spectrum containing a plurality of equidistant spectral lines; passing the pump laser radiation through a non-linear medium of a singly resonant, single-frequency optical parametric oscillator, wherein the pump laser radiation is continuously a wave or is pulsed, wherein the pulse duration in the latter case is longer than the time the optical parametric oscillation requires to reach its steady state; and coupling out the non-resonant idler or signal laser radiation from the optical parametric oscillator as usable frequency converted laser radiation. Further provided is a laser device used to carry out the method of the invention.

14 Claims, 2 Drawing Sheets

(56) References Cited

OTHER PUBLICATIONS

Catanese, Anthony et al.; "Mid-infrared frequency comb with 6.7 W average power based on difference frequency generation"; Optics Letters; vol. 45; 2020; pp. 1248-1251.
Coddington, Ian et al.; "Dual-comb spectroscopy"; Optica; vol. 3; No. 4; Apr. 2016; pp. 414-426.
Del'Haye, P. et al.; "Optical frequency comb generation from a monolithic microresonator"; Nature; vol. 450;Dec. 27, 2007; pp. 1214-1217.
Faist, Jerome et al.; "Quantum Cascade Laser Frequency Combs"; Nanophotonics; vol. 5; No. 2; 2016; pp. 272-291.
Hansch, Theodor W.; "Nobel Lecture: Passion for precision"; Reviews of Modern Physics; vol. 78; Oct.-Dec. 2006; pp. 1297-1309.
Long, D. A. et al.; "Multiplexed sub-Doppler spectroscopy with an optical frequency comb"; Phys. Rev. A.; vol. 94; No. 6; Dec. 2016; 061801; pp. 1-10.

\* cited by examiner

FREQUENCY-CONVERSION OF AN OPTICAL FREQUENCY COMB

FIELD OF THE INVENTION

The invention relates to methods and a devices for generating a frequency converted optical frequency comb.

BACKGROUND OF THE INVENTION

Laser sources generating spectra in the form of an optical frequency comb have become attractive for a variety of applications, specifically in fields such as precision spectroscopy, gas sensing, and quantum optics. Optical frequency combs are used for applications including frequency metrology, spectroscopy, and optical communications.

The spectrum of an optical frequency comb comprises a plurality of equidistant narrow-linewidth "modes". The linewidth of the individual modes is much narrower than the spacing between the modes. The center frequencies of the modes can be determined with high accuracy, thus allowing for precise measurement of an unknown optical frequency via measurement of the beat frequency between a known comb mode and the unknown radiation.

In dual optical frequency comb spectroscopy, high-resolution optical absorption spectra are measured using two optical frequency combs with slightly different frequency spacing. Similar spectroscopic measurements can be obtained using a single optical frequency comb in combination with a continuous wave (CW) laser in a heterodyne arrangement.

Practical comb sources are mostly limited to Ti:sapphire and Er:fiber mode-locked lasers and therefore to the near-infrared spectral region at wavelengths of less than 2 µm. Some progress has been made to create optical frequency combs at different optical frequencies. However, in some optical frequency ranges there is no optical gain medium available to generate the appropriate spectra at a required optical power. Non-linear optical frequency conversion is used to generate optical frequency combs in such "difficult" optical frequency ranges. But conventional techniques for frequency conversion with high conversion efficiency are complicated, have high cost, and/or do not provide broad tuning of the center frequency of the spectrum or do not allow fast, easy adjustment of the comb mode spacing.

Frequency conversion of optical frequency combs and related spectra also can be accomplished at high power using optical parametric oscillators. An optical parametric oscillator is a light source similar to a laser, but based on optical gain from parametric amplification in a non-linear medium rather than from stimulated emission. In the parametric amplification process, initially a pump photon passes through the non-linear medium and spontaneously generates a signal and an idler photon. In a singly resonant optical parametric oscillator, the non-linear medium is placed in an optical cavity that is resonant for either the signal or idler laser radiation, so that the resonant signal or idler laser radiation passes through the nonlinear medium and further pairs of signal and idler photons are produced by difference frequency generation from the resonant laser radiation and the pump laser radiation. Singly resonant synchronously pumped optical parametric oscillators have been used successfully to convert an optical frequency comb generated in a mode-locked laser source to the mid-infrared spectral range (see F. Adler, et al., "Phase-stabilized, 1.5 W frequency comb at 2.8-4.8 µm," Optics Letters 34, pp. 1330-1332, 2009). As the optical parametric oscillator is pumped by a pulsed laser source with a pulse duration shorter than the cavity round-trip time, the path length of the optical cavity of the singly resonant optical parametric oscillator must be stabilized so that the round-trip time of the resonant signal or idler laser radiation matches e.g. an integer multiple of the repetition period of the pump laser pulses. This is required to ensure overlap of the resonant laser pulses circulating in the cavity and the pump laser pulses in the non-linear medium. In the frequency domain, such synchronization results in a comb of cavity modes of the optical parametric oscillator that are stabilized to the comb modes of the pump laser radiation. Both the mode-locked laser source for generating the pulsed pump laser radiation and the synchronized optical parametric oscillator are independently complicated and expensive devices, such that this approach entails very high cost and complexity.

In addition to wide spectral coverage and/or tuning, it is also useful for some applications to be able to widely adjust the mode spacing of the optical frequency comb. In dual optical frequency comb and heterodyne optical frequency comb spectroscopy, the spectral resolution and spectral extent of a measurement is related to the comb mode spacing and, in the case of dual optical frequency combs, to the difference between the comb mode spacing of the two optical frequency combs. The known approach of frequency conversion of optical frequency combs using optical parametric oscillation requires mode-locked laser sources for generation of the pump laser radiation. Accordingly, the mode spacing cannot be readily adjusted.

Against this background it is readily appreciated that there is a need for an improved technique for generating frequency converted laser radiation with a spectrum in the form of an optical frequency comb or related spectra.

SUMMARY OF THE INVENTION

It is thus an object of the invention to provide a method and a laser device that enable the generation of a frequency converted optical frequency comb and that are easy to implement at low cost. It is a further object of the invention to enable adjustment of the center frequency and the mode spacing in a frequency converted optical frequency comb.

In accordance with the invention, a method for generating frequency converted laser radiation is disclosed. The method comprises the steps of:

generating pump laser radiation with a spectrum containing a plurality of equidistant spectral lines;

passing the pump laser radiation through the non-linear medium of a singly resonant, single frequency optical parametric oscillator, wherein the pump laser radiation is continuous wave or pulsed, wherein the pulse duration in the latter case is longer than the time the optical parametric oscillation requires to reach its steady state; and coupling out the non-resonant idler or signal laser radiation from the optical parametric oscillator as usable frequency converted laser radiation.

Moreover, a laser device is disclosed comprising:

a pump laser source configured to generate pump laser radiation with a spectrum containing a plurality of equidistant spectral lines;

a singly resonant, single frequency optical parametric oscillator comprising a non-linear medium located in an optical cavity, with the pump laser radiation passing through the non-linear medium, wherein the optical cavity is configured to be resonant at only a single cavity mode, wherein the pump laser radiation is continuous wave or pulsed, wherein the pulse duration in the latter case is longer than the time the optical parametric oscillator requires to reach its steady state; and an arrangement of one or more optical components configured to couple out the non-resonant idler or signal laser radiation from the optical parametric oscillator as usable frequency converted laser radiation.

In accordance with the invention, the pump laser radiation having a spectrum containing a plurality of equidistant spectral lines means that the spectrum either is an optical frequency comb or a superposition of two or more different optical frequency combs or a superposition of a continuous wave laser radiation at one or more frequencies with one or more optical frequency combs.

According to the invention, a singly resonant, single frequency optical parametric oscillator (meaning that the optical cavity of the optical parametric oscillator is resonant at only a single cavity mode) is used rather than an optical parametric oscillator with a cavity that is resonant at many different cavity modes, the latter being typical in known synchronized arrangements of mode-locked pump laser sources and optical parametric oscillators. Optical parametric oscillation on the basis of an optical cavity that is configured to be resonant at only a single cavity mode requires that the pump laser radiation is continuous wave (including quasi-continuous wave) or has a pulse duration that is long enough for the stored energy in the cavity mode to reach its steady state. This typically takes several times the cavity round-trip time.

If the optical parametric oscillator is resonant at the frequency of the signal (respectively idler) laser radiation, then the non-resonant idler (respectively signal) laser radiation coupled out from the optical parametric oscillator has a spectrum which is the convolution of the spectrum of the pump laser radiation and the single-line, narrow-linewidth cavity mode spectrum of the singly resonant and single frequency optical parametric oscillator. In other words, the spectrum of the non-resonant output, i.e. the usable frequency converted laser radiation coupled out from the optical parametric oscillator is a frequency converted replica of the spectrum of the pump laser radiation. To achieve this, the resonant linewidth of the singly resonant, single frequency optical parametric oscillator should be (significantly) smaller than the linewidths of the equidistant spectral lines contained in the pump laser radiation.

In an embodiment of the invention, the frequency of the usable frequency converted laser radiation is adjusted by changing the phase matching conditions of the non-linear medium and/or changing the resonant frequency of the singly resonant, single-frequency optical parametric oscillator and/or changing the resonant mode of the singly resonant single-frequency optical parametric oscillator and/or tuning the center frequency of the pump laser radiation.

The center wavelength of the optical frequency comb of the non-resonant output of the optical parametric oscillator can thus be widely tuned by adjusting the phase matching in the non-linear medium, by changing the optical cavity length, by selection of a different single cavity mode, and/or by tuning the center wavelength of the pump laser radiation. The center wavelength of the pump laser radiation and the phase matching in the non-linear medium are closely related.

The spectral extent of the frequency converted laser radiation is limited by the phase matching bandwidth of the non-linear medium. Singly resonant. Single-frequency optical parametric oscillators efficiently convert the pump laser radiation, so that the power of the usable frequency converted laser radiation can be expected to be 10-50% of the power of the pump laser radiation.

In practice, the comb modes contained in the non-resonant output of the optical parametric oscillator will drift if there is drift in the resonant cavity mode, e.g. due to changing environmental conditions. For some applications this drift may be insignificant, but other applications require high stability of the output spectrum. Drift of the frequency converted spectrum can be actively stabilized in accordance with the invention by electronic feedback to the spectrum of the pump laser radiation and/or to the resonant mode of the singly resonant, single-frequency optical parametric oscillator.

In an embodiment of the invention, the pump laser radiation is generated by frequency modulation of the laser radiation emitted by a continuous wave laser source. For example, a single frequency continuous wave distributed feedback (DFB) diode laser or an external cavity diode laser (ECDL) can be used as a pump laser source which is followed by an electro-optic modulator (EOM). Driving the EOM by a periodic radio frequency modulation generates an optical frequency comb in the spectrum of the laser radiation transmitted by the EOM, in which the frequency comb has a flat spectral envelope. The spectral extent of the frequency comb equals twice the maximum frequency in the chirped modulation. The mode spacing of the generated optical frequency comb is equal to the repetition rate of the periodic chirping, and the resulting mode spacing is much broader than the linewidth of the continuous wave laser. A rare earth-doped optical fiber amplifier can be used to amplify the thus generated optical frequency comb before passing it through the non-linear medium of the optical parametric oscillator. Such amplifiers are relatively inexpensive and available at an output power in the range of 1-1000 W. Advantageously, an optical frequency comb generated in the above-described fashion by frequency modulation of a continuous wave laser radiation is quasi-continuous wave, thus satisfying the requirement with regard to the pulse duration in the singly resonant, single-frequency optical parametric oscillator according to the invention. Advantageously, the mode spacing of the optical frequency comb in the useable frequency converted laser radiation coupled out from the optical parametric oscillator can be changed easily by adjusting the period of the frequency modulation.

An advantage of the invention, specifically for applications like frequency metrology and dual comb spectroscopy, is that it enables efficient frequency conversion at low cost and low complexity. The singly resonant, single-frequency optical parametric oscillator itself has low or moderate complexity (depending on whether the application demands that the frequency converted optical frequency comb is compensated for cavity drift). Additionally, optical frequency combs generated from continuous wave laser radiation by frequency modulation can be used to adjust the mode spacing in the non-resonant output laser radiation, so wide tuning of comb mode spacing is enabled with frequency conversion into a desired spectral range by optical parametric oscillation.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
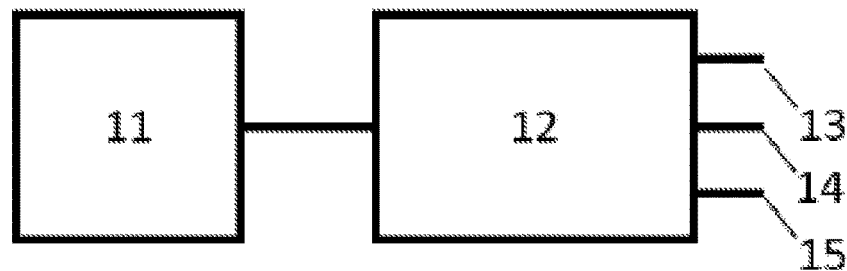
FIG. 1 schematically shows a laser device according to an embodiment of the invention as a block diagram.

FIG. 1 schematically illustrates a laser device according to an embodiment of the invention. The laser device comprises a pump laser source 11. The pump laser source 11 generates at its output pump laser radiation with a spectrum containing a plurality of equidistant spectral lines. The spectrum of the pump laser source 11 may be an optical frequency comb, a combination of two or more different optical frequency combs, or a combination of continuous wave laser radiation with one or more optical frequency combs. The pump laser radiation is provided to a singly resonant, single-frequency optical parametric oscillator 12. In the depicted embodiment, the optical parametric oscillator 12 has three outputs, namely a residual pump output 13, a resonant output 15 and a non-resonant output 14. The non-resonant (idler or signal) laser radiation is coupled out from the optical parametric resonator 12 as usable frequency converted laser radiation via output 14. The (idler or signal) laser radiation at the non-resonant output 14 has a spectrum which is the convolution of the spectrum of the pump laser radiation and the spectrum of the single resonant cavity mode of the optical parametric oscillator 12. The single cavity mode spectrum is much narrower than the spacing between the spectral lines in the pump spectrum, thus the laser radiation at the non-resonant output 14 also contains a plurality of equidistant spectral lines with the same spectral shape and spectral feature spacing as in the pump laser radiation.

Figure 2:
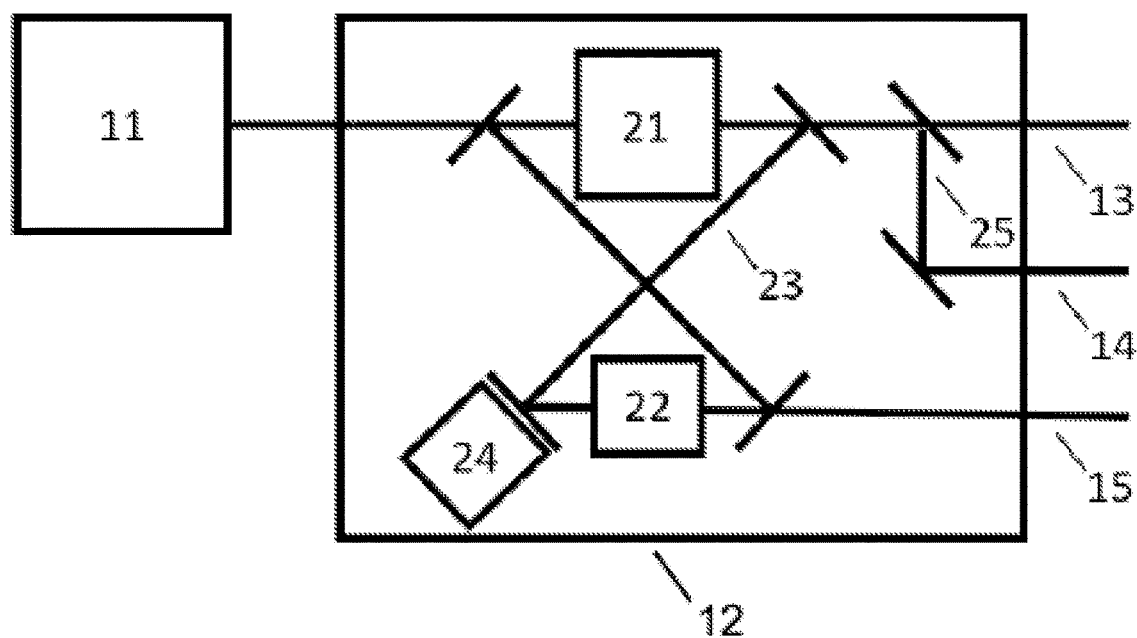
FIG. 2 is a more detailed illustration of the laser device of FIG. 1.

As can be seen in FIG. 2, a non-linear medium 21 (e.g. a periodically poled non-linear crystal) is placed inside a bow-tie cavity 23 that is resonant for either the signal or idler laser radiation. An etalon 22 is placed in the cavity 23 outside the beam path of the pump laser radiation and the non-resonant (idler respectively signal laser radiation). The cavity 23 is designed to be resonant at only one single cavity mode which matches the spectrum of the signal or idler laser radiation. The residual pump laser radiation and the non-resonant output beam paths (for coupling out the usable frequency converted laser radiation) are split using a dichroic filter 25. The residual pump 13 and resonant output 15 may be accessible to the user of the device as well. According to the invention, the pump laser radiation can be continuous wave or pulsed. In the case of pulsed pump laser radiation the pulse duration is longer than the time the optical parametric oscillator requires to reach its steady state, i.e. long enough for the stored energy in the resonant cavity mode to reach its steady state. This typically takes several times the cavity round-trip time.

The optical frequency comb contained in the spectrum of the usable laser radiation at the non-resonant output 14 can be frequency tuned by adjusting the phase matching conditions in the non-linear medium 21, for example by heating, rotating, or shifting the medium. The optical frequency comb contained in the radiation at the non-resonant output 14 can also be tuned by adjusting the length of the cavity, for example by using a piezoelectric transducer 24 carrying one of the cavity mirrors and/or by rotating the etalon 22. The optical frequency comb at the non-resonant output 14 can further be tuned by selecting a different cavity mode for oscillation, for example by rotating the etalon 22 to such a degree that a cavity mode hop occurs. Finally, the optical frequency comb at the output 14 can be tuned by wavelength tuning of the pump laser source 11. When the pump laser source 11 is wavelength tuned, the resonant mode of the cavity 23 does not change, so energy conservation causes the radiation at the non-resonant output 14 to change by the same amount of energy as the pump laser radiation.

Figure 3:
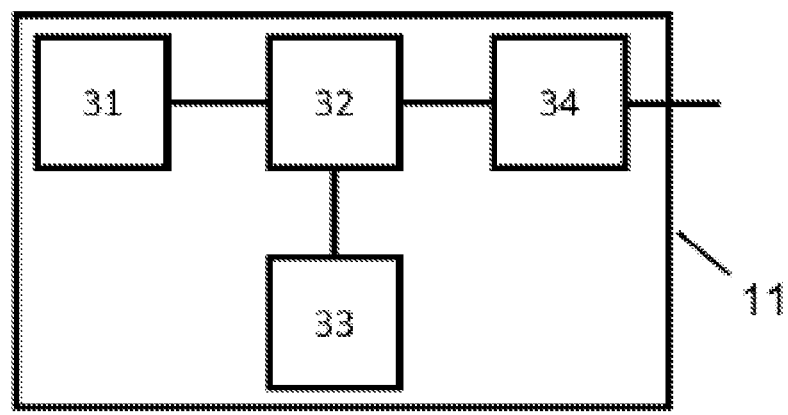
FIG. 3 schematically shows the pump laser source of the laser device illustrated in FIGS. 1 and 2.

FIG. 3 depicts a preferred embodiment of the pump laser source 11. A single frequency continuous wave laser 31, e.g. a DFB diode laser or an ECDL, is fiber coupled, and the output is connected to an EOM 32. The EOM is driven by a radio frequency source 33 that delivers a periodically frequency modulated, i.e. chirped radio frequency signal. The radiation at the fiber-coupled output of the EOM 32 consists of an optical frequency comb with mode spacing equal to the repetition rate of the periodic chirp, and with spectral extent equal to twice the maximum frequency of the chirp. The period of the chirp is variable for adjusting the mode spacing of the optical frequency comb. The linewidth of the continuous wave laser 31 should be much narrower than the mode spacing. The fiber coupled optical frequency comb is input to a rare earth-doped fiber amplifier 34 that is designed to amplify narrow source spectra to high power without spectral broadening or shifting, e.g. due to Raman or Brillouin scattering.

The invention claimed is:

1. A laser device comprising:
    a pump laser source configured to generate pump laser radiation with a spectrum containing a plurality of equidistant spectral lines, the spectrum being either an optical frequency comb or a superposition of two or more different optical frequency combs or a superposition of a continuous wave laser radiation at one or more frequencies with one or more optical frequency combs;
    a singly resonant, single frequency optical parametric oscillator comprising a non-linear medium located in an optical cavity, with the pump laser radiation passing through the non-linear medium, wherein the optical cavity is configured to be resonant at only a single cavity mode, wherein the pump laser radiation is continuous wave or pulsed, wherein the pulse duration in the latter case is longer than the time the optical parametric oscillator requires to reach its steady state; and
    an arrangement of one or more optical components configured to couple out the non resonant idler and/or signal laser radiation from the optical parametric oscillator as usable frequency converted laser radiation, the spectrum of which being a frequency converted replica of the spectrum of the pump laser radiation.

2. The laser device of claim 1, wherein the pulse duration of the pump laser radiation is longer than a multiple of the round-trip time of the resonant signal or idler radiation in the optical cavity.

3. The laser device of claim 1, wherein the optical cavity is a bow-tie cavity.

4. The laser device of claim 1, wherein an etalon is located within the optical cavity in the beam path of the resonant signal or idler laser radiation and outside the beam paths of the pump laser radiation and the non-resonant idler or signal laser radiation.

5. The laser device of claim 1, wherein the non-linear medium is a periodically poled non-linear crystal.

6. The laser device of claim 1, wherein the pump laser source comprises a continuous wave laser and a frequency modulator configured to modulate the frequency of the laser radiation emitted by the continuous wave laser.

7. The laser device of claim 6, wherein the frequency modulator comprises an electro-optic modulator and a radio frequency source driving the electro-optic modulator, wherein the radio frequency source is configured to deliver a periodically chirped radio frequency signal to the electro-optic modulator.

8. The laser device of claim 7, wherein the period of the chirping is variable.

9. A method for generating frequency converted laser radiation, comprising the steps of:
generating pump laser radiation with a spectrum containing a plurality of equidistant spectral lines, the spectrum being either an optical frequency comb or a superposition of two or more different optical frequency combs or a superposition of a continuous wave laser radiation at one or more frequencies with one or more optical frequency combs;
passing the pump laser radiation through a non-linear medium of a singly resonant, single-frequency optical parametric oscillator, wherein the pump laser radiation is continuous wave or pulsed, wherein the pulse duration in the latter case is longer than the time the optical parametric oscillation requires to reach its steady state; and
coupling out the non-resonant idler and/or signal laser radiation from the optical parametric oscillator as usable frequency converted laser radiation, the spectrum of which being a frequency converted replica of the spectrum of the pump laser radiation.

10. The method of claim 9, wherein the resonant linewidth of the singly resonant optical parametric oscillator is smaller than the linewidths of the equidistant spectral lines contained in the pump laser radiation.

11. The method of claim 9, wherein the frequency of the usable frequency converted laser radiation is adjusted by changing the phase matching conditions of the non-linear medium and/or changing the resonant frequency of the singly resonant, single-frequency optical parametric oscillator and/or changing the resonant mode of the singly resonant, single-frequency optical parametric oscillator and/or tuning the center frequency of the pump laser radiation.

12. The method of claim 9, wherein the optical spectrum of the usable frequency converted laser radiation is actively stabilized by electronic feedback to the spectrum of the pump laser radiation and/or to the resonant mode of the singly resonant optical parametric oscillator.

13. The method of claim 9, wherein the pump laser radiation is generated by frequency modulation of the laser radiation emitted by a continuous wave laser source.

14. The method of claim 13, wherein the spacing of equidistant spectral lines contained in the usable frequency converted laser radiation coupled out from the optical parametric resonator is changed by adjusting the period of the frequency modulation.

* * * * *